United States Patent Office 2,871,672
Patented Feb. 3, 1959

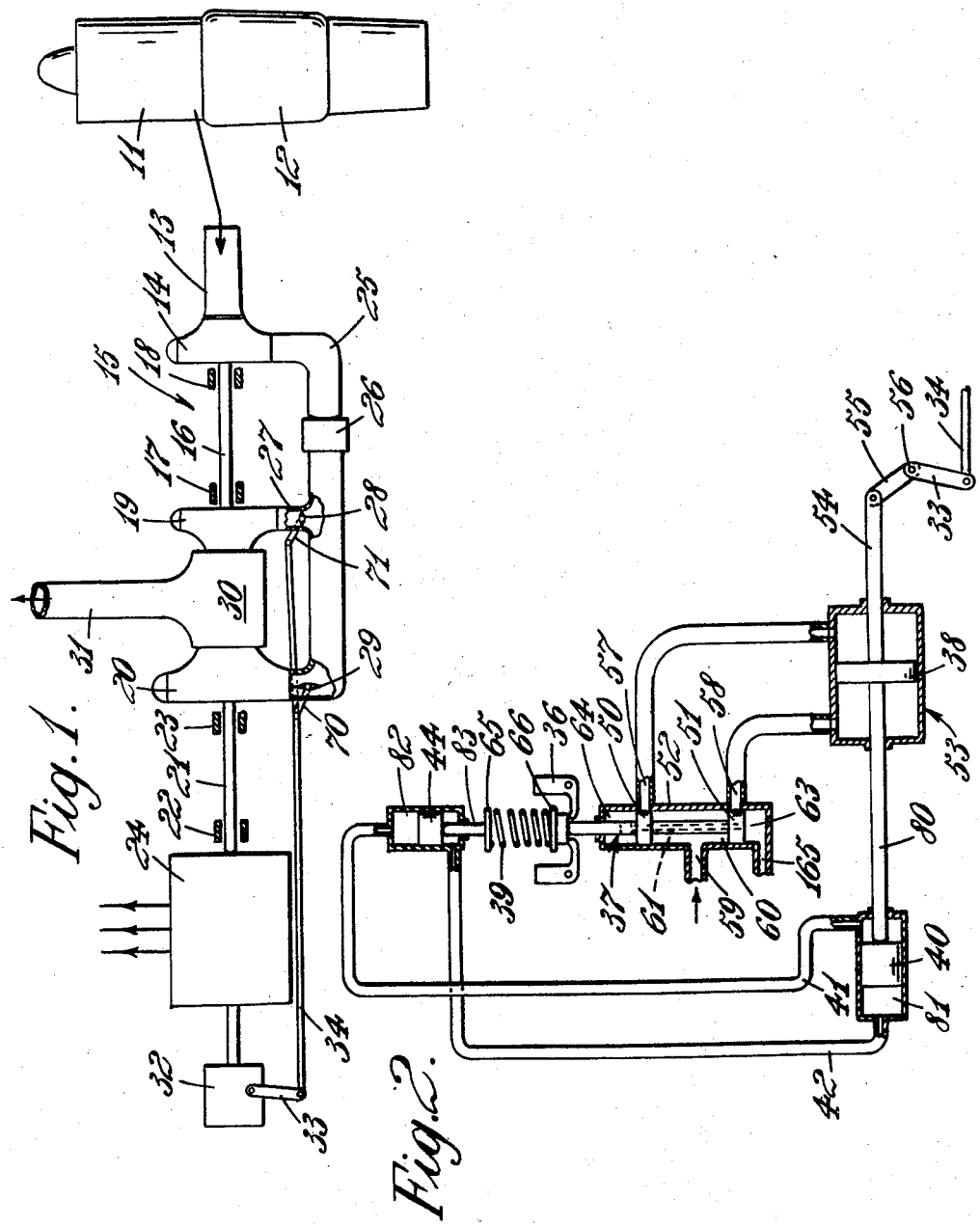

2,871,672

REFRIGERATION SYSTEMS

Kenneth Raymond Boydell, Gloucester, England, assignor to Rotol Limited, Gloucester, England, a British company Application January 24, 1957, Serial No. 636,172

Claims priority, application Great Britain February 8, 1956

11 Claims. (Cl. 62—172)

This invention relates to refrigeration systems, and concerns refrigeration systems of the kind including a compressor/expander unit which incorporates a rotary compressor arranged to be driven by a turbine drivingly connected to it, the compressor being supplied with compressed air tapped from a suitable source, for example the compressor of a gas turbine engine, and the air compressed in the compressor of the compressor/expander unit being used to drive the turbine of the expander unit, the energy so abstracted from the air resulting in cooling of the air which is then used as the cooling medium in the refrigeration system. A refrigeration system of the kind described may be constructed so that the turbine of the expander unit drives, in addition to the compressor of the expander unit, a rotary machine, for example an alternator, so that energy is abstracted from the compressed air by the turbine to drive the rotary machine as well as the compressor of the expander unit. Where the turbine drives a rotary machine the compressor of the expander unit is sometimes dispensed with, air tapped from the suitable source being led directly to the turbine.

With either of these arrangements, however, in order to prevent over-speeding of the system, it has been found necessary to incorporate a compressor, the working fluid passage of which, is not connected with the working fluid passage of the refrigeration system, which compressor is driven by the turbine so that, when the rotary machine is off-loaded, this compressor may be brought into operation to absorb the energy no longer required by the rotary machine, and thus maintain the characteristics of the refrigeration system substantially constant. The air compressed in the last mentioned compressor is usually discharged to atmosphere.

With either of these arrangements substantially the same amount of air is tapped from the compressed air source when the rotary machine is off-loaded as when it is fully loaded, and under the off-loaded condition, a large amount of the energy of the air tapped from the compressed air source is wasted in unnecessary compression of further air which is merely discharged to atmosphere.

This is a most undesirable arrangement, especially where the compressed air source is a prime-mover such as a gas turbine engine, since the wastage of energy when the rotary machine is off-loaded or partly off-loaded reduces the efficiency of the prime-mover.

The object of the present invention is to provide an arrangement which avoids or reduces this wastage.

According to the present invention, there is provided a refrigeration system of the kind described, further comprising a rotary power conversion machine, a second turbine drivingly connected to said rotary machine, duct means for leading compressed air from said source to said second turbine to drive said second turbine, first valve means for controlling the flow of compressed air to the turbine of said expander unit to drive the turbine of the expander unit, second valve means for controlling the flow of compressed air to said second turbine to drive the second turbine, and a speed governor responsive to change of speed of said rotary machine, said speed governor being connected to adjust said first and second valve means together so that when the speed of the rotary machine increases due to a decrease of the load upon it said first valve means is opened and said second valve means is closed, and when the speed of said rotary machine decreases due to an increase in the load upon it said first valve means is closed and said second valve means is opened.

It is preferred that said speed governor be arranged to control said first and second valve means so that when the rotary machine is fully loaded, said first valve means is in a fully closed or substantially fully closed position and said second valve means is in a fully open position, and when the rotary machine is fully off-loaded said first valve means is in a fully open position and said second valve means is in a limiting position in which it is nearly closed.

In the preferred arrangement just defined when the second valve means is in its limiting position in which it is nearly closed only sufficient air passes to the second turbine to maintain the speed of the fully off-loaded rotary machine at the required speed. Furthermore, when the first valve means is fully closed or substantially fully closed, no, or substantially no air passes to the turbine of the compressor/expander unit, and the turbine driving the rotary machine alone is relied upon to abstract sufficient energy from the air of the refrigeration system to cool it to the required temperature.

Preferably said speed governor comprises a device movable in response to change of speed of said rotary machine from a datum speed, and hydraulically operated servo-mechanism including a hydraulic servo-motor connected to adjust said first and second valve means and a control valve displaceable from an equilibrium position by said speed responsive device to supply hydraulic fluid to said motor to actuate said motor. Said speed governor may also comprise, according to a feature of the invention, adjusting means for temporarily adjusting the datum setting of said speed responsive device in response to movements of said servo motor to adjust said first and second valve means, said means acting temporarily to reduce said datum setting when said servo motor is actuated following an increase in speed of said rotary power conversion machine, that is to say in the sense to open said first valve means and close said second valve means and temporarily to increase said datum setting when said servo motor is actuated following a decrease in the speed of said rotary machine, that is to say in the sense to close said first valve means and open said second valve means.

Adjusting means as just defined act to reduce hunting of the speed governor upon change of speed of said rotary machine from the speed predetermined by the setting of the datum of the speed responsive device in a manner hereinafter explained.

Preferably said duct means leads compressed air from the compressor of the compressor/expander unit to said second turbine.

An embodiment of the invention will now be described by way of example with reference to the accompanying diagrammatic drawings whereof:

Figure 1 shows a refrigeration system according to the invention, and

Figure 2 shows details of part of the system shown in Figure 1.

Referring to Figure 1, a tapping is taken from the high pressure end of the compressor 11 of a gas turbine engine shown generally at 12, and a duct 13 connected at this point leads to the inlet side of a high pressure compressor 14 which forms part of a compressor/expander refrigeration unit shown generally at 15. The compressor rotor 14 is secured upon the right-hand end, in Figure 1, of a shaft 16 mounted for free rotation in bearings 17 and 18. A turbine rotor 19 forming the expander section of the refrigeration unit is secured to the other end of this shaft. A second turbine rotor 20, which may be of somewhat larger dimensions than the rotor 19, is secured upon the right-hand end of a shaft 21. This shaft is mounted for free rotation in bearings 22 and 23 and is coaxial with the shaft 16 being drivingly connected with a rotary machine, for example an alternator, shown diagrammatically at 24. From the delivery side of the compressor rotor 14, ducting 25 extends through a heat exchanger 26 and thereafter a branch duct 27 is taken from the ducting to the inlet side of the turbine rotor 19. A butterfly valve 28 is provided in this branch duct. The ducting 25 continues to the inlet side of the second turbine rotor 20, a second butterfly valve 29 being provided at this inlet, which may be somewhat greater in area than the inlet to the turbine rotor 19. The two rotors exhaust into a common chamber 30 from which a duct 31 is taken to the zone in which cooling is required.

The alternator 24 is provided with a speed governor 32 which is constructed as shown in Figure 2.

The governor 32 comprises a speed responsive device in the form of a flyball governor having a number of flyweights 36. The flyball governor is mounted for rotation in well known manner and driven with the alternator 24 at a speed equal or directly proportional thereto.

The flyball governor is arranged to control the position of a control valve 37 provided with a pair of spaced apart lands 50, 51 each closing, in the equilibrium position of the valve 37, a port in a housing 52 containing the valve 37, the ports, denoted 57 and 58 in Figure 2, communicating each with one side of a double acting hydraulic servo-motor 53 having a piston 38 connected, by means of a connecting rod 54, with one end of a lever 55 carried at its other end on a shaft 56 so that movement of the piston 38 causes rotation of the shaft.

The shaft also carries a lever 33 (see also Figure 1) which is connected by a rod 34 to operating arms 70, 71 of the valves 28 and 29.

The space 60 in the housing 52 between the lands 50, 51 communicates, through a duct 59, with a supply of hydraulic fluid under pressure, and the valve has an internal passage 61 which communicates with each of the remaining spaces 63, 64 in the housing 52, one of these spaces, the lower one in Figure 2, communicating with drain through a passage 165.

In Figure 2 the flyball governor is shown in its equilibrium position which is determined by the loading in a speeder spring 39 which acts between an abutment 65 and a platform 66 on the valve 37. The loading in the spring 39 is adjusted so that when the alternator 24 is running at the required speed the flyweights 36 assume the position shown in Figure 2.

In their equilibrium position the flyweights 36 support the valve 37 in its equilibrium position so that the ports 57, 58 remain closed.

If the alternator increases in speed, the flyweights move outwardly and lift the valve 37 against the action of the spring 39 so that the lands 50 and 51 uncover the ports 57 and 58, port 57 to the high pressure fluid space 60 and port 58 to the space 63 containing fluid at the drain pressure. Hydraulic fluid under pressure therefore passes through port 57 to the right hand side of the motor 53 and the piston 38 moves to the left in Figure 2 and adjusts the valves 28, 29 through the connecting rod 54, lever 55, shaft 56, lever 33, rod 34 and arms 70 and 71. Similarly if the alternator speed decreases the flyweights move inwardly and the valve 37 is lowered under the action of the spring 39 to uncover the port 58 to the high pressure space 60 and the port 57 to the space 64 which is in communication with the drain passage 65 through the passage 61 and the space 63. Fluid under pressure therefore passes to the left hand side of the hydraulic motor 53 and the piston 38 moves to the right in Figure 2 to adjust the valves 28 and 29.

The transmission between the piston 38 and the arms 70 and 71 is arranged so that towards the left hand end of the range of movement of the piston 38 the valve 29 is in a limiting position in which it is nearly closed, and the valve 28 is fully open, and towards the right hand end of the range of movement of the piston 38 and the valve 29 is fully open and the valve 28 is fully closed.

Furthermore, the inlet area to the turbine 20 itself, and the turbine 20 are so designed that under the normal operating conditions of the gas turbine engine, air under pressure tapped from the high pressure end of the compressor 11 is able to drive the turbine 20 and the alternator 24 at the required speed when the alternator 24 is fully loaded and the valve 29 is fully open. Under these conditions the turbine 19 is not powdered because the valve 28 is fully closed.

The turbine 19 however rotates with the compressor 14, since the compressed air passing through the duct 13 tends to drive this compressor. The temperature of the compressor air in the ducting 25 is reduced by the heat exchanger 26 and in expanding through the turbine 20 sufficient energy is absorbed to drive the alternator. Consequently a large amount of heat is given up during this expansion so that the temperature of the exhausting air in the chamber 30 and in the ducting 31 is reduced considerably. This temperature is of course dependent upon a number of factors and the system is designed according to the final temperature (within limits) desired, and to the energy input requirements of the alternator.

If now the electrical loading upon the alternator is reduced, the alternator will tend to increase in speed and consequently the servo motor 53 will be actuated as previously explained, and the piston 38 displaced to the left in Figure 2 by an amount depending upon the extent of speed increase, so that the valve 28 will open a little and the valve 29 will partially close. Hence less flow will be directed into the turbine 20 so that the energy absorbed thereby, and the speed thereof together with the speed of the alternator, will decrease until the flyweights return to their equilibrium position and the valve 37 again closes the ports 57, 58 thereby stopping the servo motor 53. Since the energy absorbed by the turbine 20 decreases, this tends to increase the temperature in the chamber 30. Because valve 28 is now open however compressed air flows into the turbine 19 through the valve 28 and the system is so designed that the additional energy absorbed in the turbine 19 is sufficient only to effect compensatory energy absorption by this turbine to maintain the temperature of the air in the chamber 30 within desired limits, for all positions of the valves 28 and 29.

Thus when the alternator is off-loaded it will be clear that the compressed air tapped from the compressor of the gas turbine engine has to supply less energy to maintain the system in proper function and that therefore less flow of compressed air is required through the system and only an amount equal to that required is extracted from the engine.

If the alternator is running under a low load condition, and the load on the alternator is increased, the consequent drop in speed of the alternator causes the servo motor 53 to be actuated as previously explained and the piston 38 is displaced to the right in Figure 2 to open the valve 29 and close the valve 28. More air is then fed into the turbine 20 which speeds up until the flyweights return to their equilibrium position and the valve 37 again closes the ports 57 and 58 and stops the servo motor.

The increased energy absorption which takes place in the turbine 20 tends to reduce the temperature in the chamber 30 but this reduction of temperature is counteracted by the reduction of energy absorption in the turbine 19 which tends to increase the temperature in the chamber 30.

When the alternator is fully off-loaded, the tendency of the alternator to overspeed causes the speed governor 32 to move the valve 29 to its limiting position in which it is nearly closed, and the valve 28 to its fully open position. The system is designed so that with the valve 29 in its limiting position in which it is nearly closed the turbine 20 receives only sufficient air to drive the alternator at the required speed. After the alternator is fully off-loaded therefore the flyball governor again settles down in its equilibrium position together with the valve 37, and the alternator remains under the control of the speed governor so that the alternator may again be brought directly into operation when required.

When the alternator is fully off-loaded the flow of compressed air tapped from the compressor 11 is reduced to a minimum, that is to say to a value which is sufficient only to give rise, during its expansion in the turbine 19, to a drop in temperature to the desired limit in the chamber 30, the cross-sectional area of the inlet to the turbine 19 and the capacity of the turbine 19 itself being designed to this end.

Since, under these conditions, the flow of compressed air through the system is reduced to an absolute minimum, only the energy required in the refrigeration system is extracted from the compressor of the engine.

The linkage from the governor 32 to the valves 28 and 29 may however be arranged such that when valve 29 is fully open, valve 28 is partially open so that the compressor/expander unit 15 is always operating as such. In this way the pressure in ducting 25 is somewhat higher and under full-load conditions the final temperature in duct 31 is dependent upon the expansion through both turbines 19 and 20 instead of through only the turbine 20.

In order to prevent hunting of the speed governor 32 the governor incorporates an acceleration sensitive device. Referring to Figure 2 this device comprises a piston 40 movable in a cylinder 81 and attached by means of a connecting rod 80 with the piston 38 for movement therewith. The working space in the cylinder 81 on the side of the piston 40 adjacent the piston 38 communicates, via a passage 41, with a cylinder 82 containing a piston 44 which is connected by means of a connecting rod 83 with the abutment 65 previously described. Piston 44 is displaceable in the cylinder 82 to move the abutment 65 to load or unload the speeder spring 39.

Further passage means 42 are provided communicating the cylinder 81 on the side of the piston 40 remote from the piston 38 with the cylinder 82 on the side of the piston 44 adjacent the abutment 65, the passage means 41 communicating with the cylinder 82 on the other side of the piston 44. The cylinders 81 and 82 and the passage means 41 and 42 contain hydraulic fluid.

The acceleration sensitive device just described acts as follows:

When the piston 38 of the servo-motor 53 is displaced to the left in Figure 2 due to a sudden increase of alternator speed above the required speed, the piston 40 moves to the left in Figure 2 thereby displacing the piston 44 upwardly in Figure 2 to decrease the loading in the speeder spring 39.

Upon any rapid change of speed in the speed increasing direction therefore it will be seen that the action of the acceleration sensitive device is to lower the datum setting of the speed governor and thereby allow a more rapid opening of the ports 57 and 58 to effect a corrective action. Furthermore, the speed governor is called upon to perform its corrective action to reduce the speed of the alternator towards a datum speed which is higher than the true datum setting. The effect of this is to prevent or reduce the overshoot of the correction which the governor performs and thereby limit hunting of the governor upon change of speed of the alternator.

The displacement of the abutment 65 by the piston 44 is of a temporary nature only and the spring 39 in the case just envisaged allows return of the piston 44 to its original position, hydraulic fluid leaking past the piston 44 to allow the abutment 65 to reassume its original position.

In a similar way when the speed of the alternator suddenly decreases and the flyweights move inwardly to load the valve 37, the piston 38 is displaced to the right in Figure 2 and hydraulic fluid is supplied under pressure to the cylinder 82 by the piston 40 to displace the piston 44 in the sense to load the spring 39 and thereby increase the datum setting of the speed governor. The valve 37 therefore moves rapidly downwardly to open the ports 57, 58 and the valves 28, 29 are adjusted to increase the speed of the alternator towards the lower speed datum the device thereby preventing hunting of the governor as previously explained.

Instead of the butterfly valves 28 and 29, the servo-motor 53 may control the opening of sets of variable area nozzles provided one adjacent the periphery of the turbine rotor 19 and one adjacent the periphery of the turbine rotor 20.

I claim:

1. A refrigeration system comprising a rotary compressor having an air inlet and an air outlet, a first air turbine connected to drive said rotary compressor, duct means for leading compressed air to the air inlet of said rotary compressor, duct means for leading compressed air from the air outlet of said rotary compressor to said first air turbine to drive said first air turbine, a rotary power conversion machine, a second air turbine connected to drive said rotary power conversion machine, duct means for leading compressed air to said second air turbine to drive said second air turbine, first valve means for controlling the flow of compressed air to said first air turbine to drive said first air turbine, second valve means for controlling the flow of compressed air to said second air turbine to drive said second air turbine, a speed governor responsive to change of speed of said rotary power conversion machine, and means operatively connecting said speed governor with said first and second valve means to adjust said first and second valve means together upon a change of speed of said rotary power conversion machine to open said first valve means and close said second valve means when the speed of said rotary power conversion machine increases and vice versa.

2. A refrigeration system comprising a rotary compressor having an air inlet and an air outlet, a first air turbine connected to drive said rotary compressor, duct means for leading compressed air to the air inlet of said rotary compressor, duct means for leading compressed air from the air outlet of said rotary compressor to said first air turbine to drive said first air turbine, a rotary power conversion machine, a second air turbine connected to drive said rotary power conversion machine, duct means for leading compressed air to said second air turbine to drive said second turbine, first valve means for controlling the flow of compressed air to said first air turbine to drive said first air turbine, said first valve means being fully open when said rotary power conversion machine is off-loaded, second valve means for controlling the flow of compressed air to said second air turbine to drive said second air turbine, said second valve means being fully open when said rotary power conversion machine is fully loaded and nearly closed when said power conversion machine is off-loaded, a speed governor responsive to change of speed of said rotary power conversion machine, and means operatively connecting said speed governor with said first and second valve means to adjust said first and second valve means together upon a change of speed of said rotary power conversion machine to open said first valve means and close said second valve means when the speed of said rotary power conversion machine increases and vice versa.

3. A refrigeration system comprising a rotary compressor having an air inlet and an air outlet, a first air turbine connected to drive said rotary compressor, duct means for leading compressed air to the air inlet of said rotary compressor, duct means for leading compressed air from the air outlet of said rotary compressor to said first air turbine to drive said first air turbine, a rotary power conversion machine, a second air turbine connected to drive said rotary power conversion machine, duct means for leading compressed air to said second air turbine to drive said second air turbine, first valve means for controlling the flow of compressed air to said first air turbine to drive said first air turbine, said valve means being fully closed when said rotary power conversion machine is fully loaded and fully open when said rotary power machine is off-loaded, second valve means for controlling the flow of compressed air to said second air turbine to drive said second air turbine, said second valve means being fully open when said rotary power conversion machine is fully loaded and nearly closed when said power conversion machine is off-loaded, a speed governor responsive to change of speed of said rotary power conversion machine, and means operatively connecting said speed governor with said first and second valve means to adjust said first and second valve means together upon a change of speed of said rotary power conversion machine to open said first valve means and close said second valve means when the speed of said rotary power conversion machine increases and vice versa.

4. A refrigeration system comprising a rotary compressor having an air inlet and an air outlet, a first air turbine connected to drive said rotary compressor, duct means for leading compressed air to the air inlet of said rotary compressor, duct means for leading compressed air from the air outlet of said rotary compressor to said first air turbine to drive said first air turbine, a rotary power conversion machine, a second air turbine connected to drive said rotary power conversion machine, duct means for leading compressed air to said second air turbine to drive said second air turbine, first valve means for controlling the flow of compressed air to said first air turbine to drive said first air turbine, said first valve means being fully open when said rotary power conversion machine is off-loaded and partially open when said rotary power conversion machine is fully loaded, second valve means for controlling the flow of compressed air to said second air turbine to drive said second air turbine, said second valve means being fully open when said rotary power conversion machine is fully loaded and nearly closed when said power conversion machine is off-loaded, a speed governor responsive to change of speed of said rotary power conversion machine, and means operatively connecting said speed governor with said first and second valve means to adjust said first and second valve means together upon a change of speed of said rotary power conversion machine to open said first valve means and close said second valve means when the speed of said rotary power conversion machine increases and vice versa.

5. A refrigeration system comprising a rotary compressor having an air inlet and an air outlet, a first air turbine connected to drive said rotary compressor, duct means for leading compressed air to the air inlet of said rotary compressor, duct means for leading compressed air from the air outlet of said rotary compressor to said first air turbine to drive said first air turbine, a rotary power conversion machine, a second air turbine connected to drive said rotary power conversion machine, duct means for leading compressed air to said second air turbine to drive said second air turbine, duct means connected to receive the exhaust from both said air turbines, first valve means for controlling the flow of compressed air to said first air turbine to drive said first air turbine, second valve means for controlling the flow of compressed air to said second air turbine to drive said second turbine, a speed governor responsive to change of speed of said rotary power conversion machine, and means operatively connecting said speed governor with said first and second valve means to adjust said first and second valve means together upon a change of speed of said rotary power conversion machine to open said first valve means and close said second valve means when the speed of said rotary power conversion machine increases and vice versa.

6. A refrigeration system comprising a rotary compressor having an air inlet and an air outlet, a first air turbine connected to drive said rotary compressor, duct means for leading compressed air to the air inlet of said rotary compressor, a rotary power conversion machine, a second air turbine connected to drive said rotary power conversion machine, duct means for leading air from the outlet of said rotary compressor to said second air turbine to drive said second turbine, branch duct means for leading air from said duct means to said first air turbine to drive said first air turbine, first valve means in said branch duct means for controlling the flow of compressed air to said first air turbine to drive said first air turbine, second valve means in said duct means downstream of said branch duct means for controlling the flow of air to said second air turbine to drive said second air turbine, a speed governor responsive to change of speed of said rotary power conversion machine, and means operatively connecting said speed governor with said first and second valve means to adjust said first and second valve means together upon a change of speed of said rotary power conversion machine to open said first valve means and close said second valve means when the speed of said rotary power conversion machine increases and vice versa.

7. A refrigeration system comprising a rotary compressor having an air inlet and an air outlet, a first air turbine connected to drive said rotary compressor, duct means for leading compressed air to the air inlet of said rotary compressor, a rotary power conversion machine, a second air turbine connected to drive said rotary power conversion machine, duct means for leading air from the outlet of said rotary compressor to said second air turbine to drive said second air turbine, branch duct means for leading air from said duct means to said first air turbine to drive said first air turbine, a heat exchanger in said duct means upstream of said branch duct means for extracting heat from air passing through said duct means, first valve means in said branch duct means for controlling the flow of compressed air to said first air turbine to drive said first air turbine, second valve means in said duct means downstream of said branch duct means for controlling the flow of air to said second air turbine to drive said second air turbine, a speed governor responsive to change of speed of said rotary power conversion machine, and means operatively connecting said speed governor with said first and second valve means to adjust said first and second valve means together upon a change of speed of said rotary power conversion machine to open said first valve means and close said second valve means when the speed of said rotary power conversion machine increases and vice versa.

8. A refrigeration system comprising a rotary compressor having an air inlet and an air outlet, a first air turbine connected to drive said rotary compressor, duct means for leading compressed air to the air inlet of said rotary compressor, duct means for leading compressed air from the air outlet of said rotary compressor to said first air turbine to drive said first air turbine, a rotary power conversion machine, a second air turbine connected to drive said rotary power conversion machine, duct means for leading compressed air to said second air turbine to drive said second air turbine, first valve means for controlling the flow of compressed air to said first air turbine to drive said first air turbine, second valve means for controlling the flow of compressed air to said second air turbine to drive said second air turbine, a device movable in response to change of speed of said rotary power conversion machine from a datum speed, an hydraulic servo-motor connected to adjust said first and second valve means together upon a change of speed of said rotary machine from said datum speed to open said first valve means and close said second valve means when the speed of said rotary power conversion machine increases and vice versa, and an hydraulic control valve operatively connected with said speed responsive device and displaceable from an equilibrium position to supply hydraulic fluid under pressure to said motor to actuate said motor.

9. A refrigeration system as claimed in claim 8, comprising means for temporarily adjusting the datum of said speed responsive device in response to movement of said servomotor, temporarily to reduce said datum upon an increase of speed of said rotary power conversion machine and vice versa.

10. A refrigeration system as claimed in claim 8, wherein said speed responsive device comprises a speeder spring the load in which determines the datum of the device, and an abutment movable to adjust the load in said speeder spring, and said system comprises a first piston-and-cylinder assembly actuable to move said abutment temporarily to adjust the load in said speeder spring, and a second piston-and-cylinder assembly actuable by said servo-motor to supply hydraulic fluid under pressure to said first piston-and-cylinder assembly to actuate said first piston-and-cylinder assembly temporarily to reduce said datum upon an increase of speed of said rotary power conversion machine and vice versa.

11. In a combination in an aircraft of a gas turbine engine propulsion installation including an air compressor, and a refrigeration system utilizing as a working medium air compressed in the air compressor of the propulsion installation, a rotary compressor having an air inlet and an air outlet, a first air turbine connected to drive said rotary compressor, duct means for leading air compressed in the compressor of said propulsion installation to the air inlet of said rotary compressor, duct means for leading compressed air from the air outlet of said rotary compressor to said first air turbine to drive said first air turbine, a rotary power conversion machine, a second air turbine connected to drive said rotary power conversion machine, duct means for leading air compressed in the compressor of said propulsion installation to said second air turbine to drive said second air turbine, first valve means for controlling the flow of compressed air to said first air turbine to drive said first air turbine, second valve means for controlling the flow of compressed air to said second air turbine to drive said second air turbine, a speed governor responsive to change of speed of said rotary power conversion machine, and means operatively connecting said speed governor with said first and second valve means to adjust said first and second valve means together upon a change of speed of said rotary power conversion machine to open said first valve means and close said second valve means when the speed of said rotary power conversion machine increases and vice versa.

References Cited in the file of this patent

UNITED STATES PATENTS

| | | |
|---|---|---|
| 2,371,889 | Hermitte | Mar. 20, 1945 |
| 2,585,570 | Messinger et al. | Feb. 12, 1952 |